ured between the lower part 1 of this
UNITED STATES PATENT OFFICE.

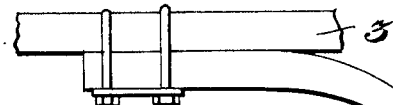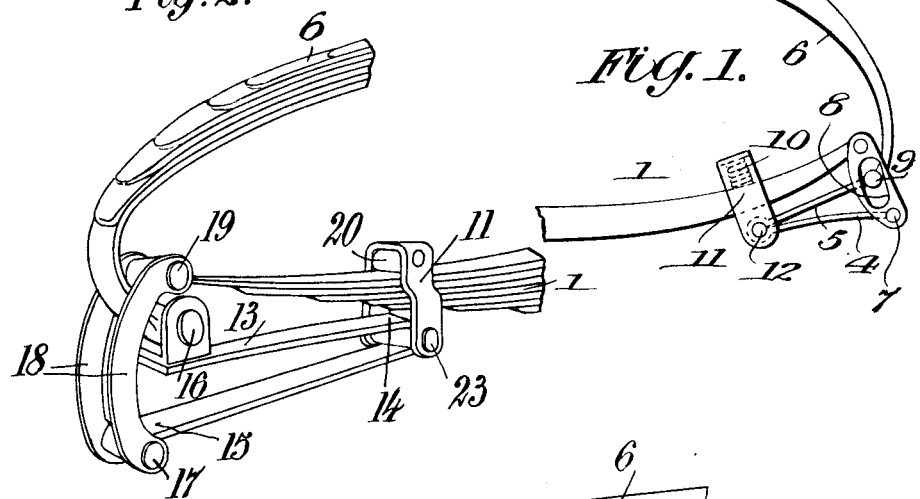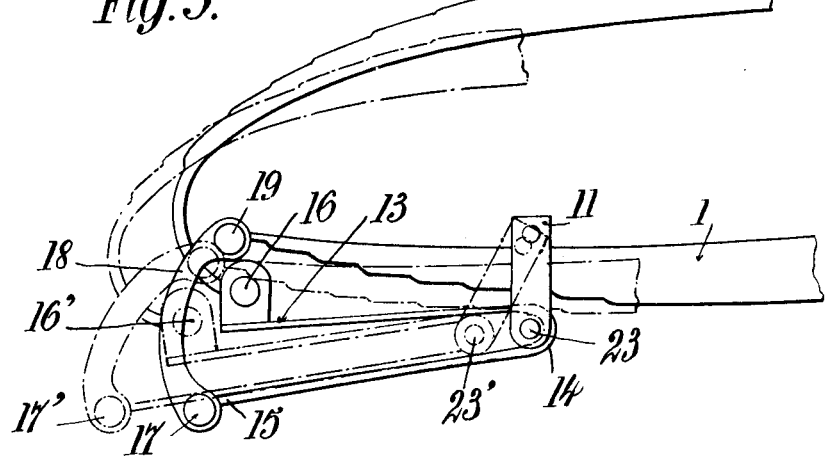

JEAN JACQUES GEORGES PAUILHAC, OF PARIS, FRANCE.

SHOCK-ABSORBER FOR VEHICLES.

1,180,423.   Specification of Letters Patent.   Patented Apr. 25, 1916.

Application filed July 1, 1912.   Serial No. 707,036.

*To all whom it may concern:*

Be it known that I, JEAN JACQUES GEORGES PAUILHAC, industrial, a citizen of the French Republic, and residing at 59 avenue Malakoff, Paris, Department of the Seine, France, have invented certain new and useful Improvements in Shock-Absorbers for Vehicles, of which the following is a specification.

This invention has for its object an improved shock absorber for vehicles of all kinds and particularly for motor cars.

The shock absorber to which the invention relates is formed substantially by a V-shape spring which is interposed either between the suspension spring and the frame of the carriage or between two parts of one of the springs if the carriage comprises a suspension arrangement with a double spring. It is also applicable to the front axle springs as well as to those of the back axle.

The accompanying drawings illustrate by way of example some forms of the arrangements which may be adopted for enabling this V-spring to absorb the shocks received by the suspension devices of carriages.

Figure 1 is a representation of the shock-absorber mounted on a back axle spring. Fig. 2 is a perspective view of another arrangement of the shock absorber. Fig. 3 is a side elevation of the same. The portion of the figure in fully drawn lines shows the shock absorber in its normal position, the portion in dots and dashes representing it in the position which it occupies when the carriage springs bend under the influence of a shock. Figs. 4, 5 and 6 illustrate different types of flexible buffers intended to be introduced between the yoke which supports the bent part of the shock absorber and the upper plate of the axle spring.

In Fig. 1 the shock absorber 4, 5 is mounted on a semi-elliptical spring on a back wheel axle. It forms a supple flexible fork interposed between the lower part 1 of this spring and the upper part 6 fixed to the frame 3. The lower arm 4 of the shock absorber is connected with the spring 1 by means of a shackle 7 which is grooved or slotted at 8 to allow of the passage of the connecting pivot 9 of the arms 5 and 6, for the purpose of enabling the shock absorber to act freely and at the same time affording a safety device in case of the breaking of the shock absorber. It will be seen that if this breakage should occur, the head 9 would come against the bottom of the slot 8 and from this moment the shackle 7 acts as an ordinary link. The shock absorber 4, 5 absorbs the slight shocks and the principal spring 1, 6 only comes into action when the wheels receive violent shocks. The suspension may be improved, in consequence of the addition of the shock-absorber 4, 5 by means of a second shock absorber formed by a spring 10 still more sensitive than the spring 4, 5. This spring 10 in this case is a spiral spring which is mounted between the principal spring 1 and a yoke 11 attached to the center 12 of the first absorber. This spring 10 absorbs the very slight shocks. When it is powerfully compressed, the spring 4, 5 comes into action and, when the tension of this latter is equal to that of the carriage spring, this principal spring is put in action.

The absorber illustrated in Figs. 2 to 6 is formed substantially by a plate spring 13, 14, 15 bent in V form with unequal arms. The shorter plate 13, 14 carries at its end 13, two lugs which enable it to be fixed by means of a bolt 16, to the frame hanger or to the hanger of the spring 6 of the carriage frame. The longer arm 14, 15 ends in a hanger or roller which enables it to be connected by means of a bolt 17, to two rigid shackles 18 which are themselves connected by means of a bolt 19 to the hanger for the axle spring 1. The V spring is held in a horizontal or practically horizontal position by means of a yoke 11 which rests simply on the carriage axle spring 1 through the medium of an india-rubber roller 20 lined with india-rubber, Figs. 2 and 4, or of a semi-cylindrical india-rubber buffer 21, Fig. 5, or a spiral spring 22, Fig. 6, or any other suitable elastic device. This yoke carries a pin or shaft 23 which is lined with india-rubber and engaged in the bent part 14 of the V spring. The V spring is thus introduced between the two springs of the carriage and as it is more supple than these latter, it absorbs in great part the shocks which are transmitted by the axle spring to the spring of the frame. The absorption of the shocks is further promoted by the arms of the V spring being unequal. As a fact, the longer arm receives the shocks at first and transmits them to the shorter arm but a certain extent of movement of the large arm causes a movement to a less extent of the small arm. The result is that, even without taking into account the flexibility of the V spring, the mere inequality of the arms attenuates the shocks which are transmitted to the frame spring by the principal spring. As the flexibility of the V spring is far from being inappreciable, this spring either through its arrangement or its flexibility prevents the shocks, in a great measure from being fully transmitted from the principal spring to the frame spring or to the frame carrier. Moreover, it should be observed that the weight of the carriage being applied at 16 to the V spring, the vertical line that runs through this point is always comprised between the point 17 and the point 23 (pivot of the support yoke of the point of the V). The result is that the yoke 11 is held in constant contact with the spring 1 without its being necessary to fix it to that spring by any device whatever.

When violent shocks occur the carriage springs give and consequently are lengthened more particularly the frame spring. It is very necessary that the shock absorber should not resist this extension. In the example illustrated it is easy to see that the point 16 must come to about 16' and that the shock absorber can fully allow of this displacement of the point 16, as the shackle 11 is able to oscillate on its flexible bearing 20 so that the point 23 comes to 23'. The point 17 thus comes to 17'. It will be seen that the shock absorber in no way resists the changes in the form of the carriage springs, a fact which is considered by the inventor as very important. It should be observed likewise that the upper part of the shackle 11 being provided with a flexible bearing 20, 21 or 22, as is the pin 23, this arrangement enables the vibrations of the V spring to be partly absorbed.

It is evident that the form of V spring illustrated in the drawing is only given by way of example and that this form may more or less vary. The arms of the V may be more or less bent, more or less open, more or less unequal in length and flexibility and the point of the V may be more or less acute or rounded.

The shock absorber may be put in place without the necessity of any alteration being made in the devices belonging to the carriage.

Having now particularly described and ascertained the nature of my said invention, and in what manner the same is to be performed, I declare that what I claim is:

1. In a spring suspension for vehicles, the combination with the upper member secured to the frame and the lower supporting spring, of a substantially V-shaped shock absorbing spring having its upper arm connected to said upper member to always move therewith, and a shackle connecting the lower arm of said V-shaped spring with the end of the lower axle supporting spring, whereby the weight of the vehicle always acts upon the end of the supporting spring through the V-shaped spring, the arms of which tend to approach each other when the vehicle is loaded.

2. In a spring suspension for vehicles, the combination with the upper member secured to the frame, and the lower supporting spring, of a substantially V-shaped shock absorbing spring having one arm connected to said upper member and the other arm linked by a shackle to said supporting spring, said shackle being adapted to receive and guide the connection between said upper arm and member.

3. In a spring suspension for vehicles, the combination with the upper member secured to the frame, and the lower supporting spring, of a substantially V-shaped shock absorbing spring having one arm connected to said upper member and the other arm linked by a shackle to said supporting spring, and a support for said shock absorbing spring at its apex.

4. In a spring suspension for vehicles, the combination with the upper member secured to the frame, and the lower supporting spring, of a substantially V-shaped shock absorbing spring having one arm connected to said upper member and the other arm linked to said supporting spring, and a yoke secured to the shock absorbing spring at its apex and having a yielding bearing upon said supporting spring.

5. In a spring suspension for vehicles, the combination with the upper and lower supporting springs, of an operatively interposed substantially V-shaped shock absorbing spring, and a yoke yieldingly mounted upon said lower supporting spring and supporting said shock absorbing spring at its apex.

6. In a spring suspension for vehicles, the combination with the upper and lower supporting springs, of an operatively interposed substantially V-shaped shock absorbing spring, the upper arm of which is directly connected to said upper spring while the lower arm is connected by a shackle to said lower spring, said shackle being slotted to receive and guide the bolt connecting said upper arm and spring.

7. In a spring suspension for vehicles, the combination with the upper member secured to the frame, and the lower supporting spring, of a substantially V-shaped shock absorbing spring having arms of unequal length, the short arm being pivotally connected to said upper member and the long arm connected by a shackle to said supporting spring.

8. In a spring suspension for vehicles, the combination with the upper member secured to the frame, and the lower supporting spring, of an operatively interposed substantially V-shaped shock absorbing spring the upper arm of which is shorter than the lower arm, said upper arm being directly connected to said upper member and the lower arm connected by a shackle to said lower spring, and a yoke suspended from said lower spring and supporting the shock absorbing spring at its apex.

9. The combination with a two part vehicle spring, of an auxiliary spring fixed at one end to said vehicle spring and composed of superposed members, a connection between one end of said members and one part of said vehicle spring, and a connection between the adjacent end of the other member and the remaining part of the vehicle spring whereby the main spring will supplement the vehicle spring when the latter has yielded to its full capacity.

In testimony whereof I affix my signature in presence of two witnesses.

JEAN JACQUES GEORGES PAUILHAC.

Witnesses:
  H. C. COXE,
  RAOUL THOMAS.